Figure 1:
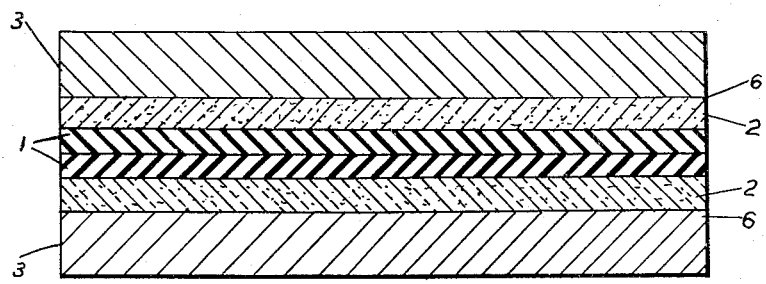

March 1, 1949.  J. C. QUAYLE ET AL  2,463,054
APPARATUS FOR HEATING INSULATING MATERIAL BY
SUBJECTING IT TO A HIGH-FREQUENCY
FIELD OF ELECTRIC FORCE
Filed April 9, 1945

Inventors
Joshua C. Quayle & Peter Jones
By
Stebbins, Blenko & Webb
Attorneys

Patented Mar. 1, 1949

2,463,054

UNITED STATES PATENT OFFICE 2,463,054

APPARATUS FOR HEATING INSULATING MATERIAL BY SUBJECTING IT TO A HIGH-FREQUENCY FIELD OF ELECTRIC FORCE

Joshua Creer Quayle, Helsby, and Peter Jones, Kelsall, near Chester, England, assignors, by mesne assignments, to British Insulated Callender's Cables Limited, London, England, a company of Great Britain Application April 9, 1945, Serial No. 587,354
In Great Britain April 22, 1944

10 Claims. (Cl. 219—47)

This invention relates to apparatus for subjecting thermoplastic or thermosetting insulating material to pressure whilst heat is generated therein by the action of a high frequency, alternating or fluctuating field of electric force, for the purpose of moulding or shaping or embossing the material or welding or jointing it to other material of a similar or different nature. In accordance with the invention such apparatus comprises a high frequency electrode having a facing of high-loss, heat-stable, insulating material of cellular form, by which pressure is applied to the material to be treated.

In the foregoing statement and hereinafter where the context permits, by the term "high-loss" insulating material we mean insulating material having a dielectric loss value of the order of 0.01 as distinct from the so-called low-loss insulating materials, such as, for instance, certain grades of steatite, low-loss ebonite and moisture-free, mica-filled borate glass, which have a dielectric loss value of the order of 0.001; by the term "cellular" insulating material we mean a material with a non-fibrous structure consisting of a large number of closely adjacent closed or intercommunicating cells of small or minute dimensions; and by the term "heat-stable" insulating material we mean a material that is heat-stable at the temperature to which the material to be treated is raised during the moulding or other operation.

Although the cellular facing material must be heat-stable, it need not be a refractory material. It may be a thermosetting plastic or a thermoplastic material that has a sufficiently high softening point and is not plasticised by the insulating material under treatment. Examples of suitable refractory materials are the porous synthetic double silicate of magnesium and aluminium having a molecular formula $2MgO.2Al_2O_3.5SiO_2$, known as porous cordierite, and certain grades of porcelain. Cordierite can be prepared by heating together the component oxides to a temperature above 1250° C. but is more commonly prepared from mixtures of clays and talc heated to a correspondingly high temperature. By appropriately controlling the heat treatment, cordierite can be produced in a form having very small intercommunicating cells or pores and presenting a surface that is sufficiently smooth and continuous to prevent sticking and absorption of the thermoplastic or thermosetting material with which it comes into contact when used in accordance with our invention as a facing for a high frequency electrode. The grades of porcelain that are suitable are those which have porosities, loss factors and thermal conductivities of the same order as the porosity, loss factor and thermal conductivity respectively of porous cordierite. Examples of thermosetting resins of cellular form suitable for facing an electrode are foamed resins of the phenol-, cresol-, melamine- and urea-formaldehyde type. As a thermoplastic facing material of cellular form, foamed polyvinylidene chloride is considered at present to be the most satisfactory, but this material cannot be used in contact with the material to be heat-treated where that material is polyvinyl chloride or other thermoplastic having a plasticising action on the polyvinylidene chloride. Polyvinylidene chloride is sold in the form of fine grains and can be converted to a moulded body of cellular form by incorporating a blowing agent and heating.

The provision of an electrode with a facing of high-loss insulating material of cellular form presents two advantages. Owing to its cellular structure, the facing has a low thermal conductivity and will considerably restrict flow of heat from the material under treatment to the electrode and thus prevent or very substantially reduce surface chilling of the material in the region of the electrode. Secondly, heat will be generated in the facing owing to the high dielectric loss value of the material used for the facing, which value is preferably of the same order as that of the material to be treated. Consequently, the temperature of the surface in contact with the thermoplastic or thermosetting material to be treated may be made to approximate to that of the said material (which we have found to be an advantage in many cases) in a simple and economical manner.

By way of example Figure 1 of the accompanying drawings shows, diagrammatically and on an enlarged scale, a cross-section through a pair of electrodes 3, each provided in accordance with the invention with a facing 2 of cordierite. The facing 2 may be from about 0.01 inch to about 0.1 inch thick, but in most cases we prefer a facing having a thickness of about 0.01 inch, as a facing of this thickness, whilst sufficient to reduce chilling of the material under treatment to an adequate extent, will not absorb as much high frequency energy as a relatively thick facing of the same material. It may be secured at 6 to the electrode by a thin layer of a suitable adhesive. A suitable adhesive is polyvinyl acetal, adhesion being secured by pressing the cellular facing layer and the electrode together after heating the adhesive between them to its softening point. Between these faced electrodes are shown the overlapping ends 1 of strips of thermoplastic material which are to be heated and welded by being subjected to pressure and to a high frequency electric field set up between the electrodes 3. The facings 2 prevent chilling of the outer surfaces of the overlapping ends of the strips and permit them to be welded together and the thickness of the two welded ends to be reduced by pressure of the faced electrodes thereon to the original thickness of a single strip, without the formation at each end of the weld of a surface groove which is disadvantageous, in that it reduces the mechanical strength of the welded strip as compared with that of the original strip.

Figure 2:
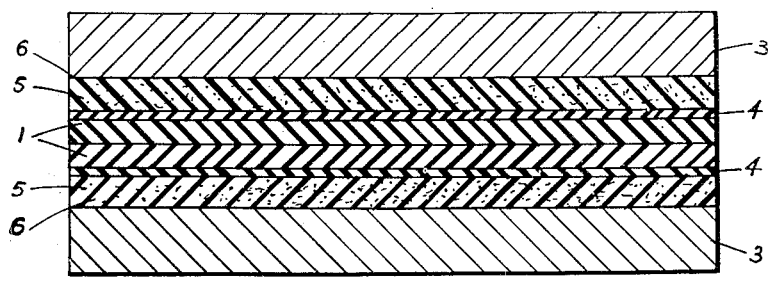

Also by way of example Figure 2 of the drawings shows, diagrammatically and on the same scale as Figure 1, a cross-section through a pair of electrodes 3, each provided in accordance with the invention with a facing 5 of a high-loss, heat-stable, foamed plastic. These facings are secured at 6 in the same manner as the facings described with reference to Figure 1. With an electrode facing of a foamed plastic, it may in some cases be found to be advantageous from the point of view of preventing penetration and adhesion of the material to be treated, to provide the outer surface of the facing with a skin or film of a non-cellular, high-loss, heat-resistant, insulating material which may be of the same composition as the facing material or of a different composition. Such films are shown at 4 in Figure 2. In this way it can be provided that heat will be generated in the facing more rapidly at the surface in contact with the strips 1 or other material to be heat and pressure treated than in the rest of the facing, because little heat will be generated within the pores or cells of the cellular material 5. This will assist in the prevention of surface chilling of the strips 1 or other material and in the case of a welding operation in the obtaining of sound welds.

What we claim as our invention is:

1. In apparatus for subjecting thermoplastic or thermosetting electrical insulating material to pressure whilst generating heat therein by the action of a high frequency field of electric force, a high frequency electrode having a facing of high loss, heat-stable, electrical insulating material of cellular form, by which pressure is applied to the material to be treated.

2. In apparatus for subjecting thermoplastic or thermosetting electrical insulating material to pressure whilst generating heat therein by the action of a high frequency field of electric force, a high frequency electrode and a facing of porous cordierite thereon, by which pressure is applied to said material.

3. In apparatus for subjecting thermoplastic or thermosetting electrical insulating material to pressure whilst generating heat therein by the action of a high frequency field of electric force, a high frequency electrode and a facing of porous porcelain thereon, by which pressure is applied to said material.

4. In apparatus for subjecting thermoplastic or thermosetting electrical insulating material to pressure whilst generating heat therein by the action of a high frequency field of electric force, a high frequency electrode and a facing thereon of a foamed, high-loss, heat-stable, resin, by which pressure is applied to said material.

5. In apparatus for subjecting thermoplastic or thermosetting electrical insulating material to pressure whilst generating heat therein by the action of a high frequency field of electric force, a high frequency electrode and a facing thereon consisting of a foamed resin of the phenol-formaldehyde type, by which pressure is applied to said material.

6. In apparatus for subjecting thermoplastic or thermosetting electrical insulating material to pressure whilst generating heat therein by the action of a high frequency field of electric force, a high frequency electrode and a facing of foamed polyvinylidene chloride thereon, by which pressure is applied to said material.

7. In apparatus for subjecting thermoplastic or thermosetting electrical insulating material to pressure whilst generating heat therein by the action of a high frequency field of electric force, a high frequency electrode having a facing of a foamed high-loss, heat-stable plastic, said facing having on its outer surface a skin of non-cellular, high-loss, heat-stable insulating material.

8. In apparatus for subjecting thermoplastic or thermo-setting electrical insulating material to pressure whilst generating heat therein by the action of a high frequency field of electric force, a high frequency electrode having secured to the face thereof a layer of high-loss, heat-stable, electrical insulating material of cellular form having a thickness of from about 0.01 inch to about 0.1 inch, by which pressure is applied to the material to be treated.

9. In apparatus for subjecting thermoplastic or thermo-setting electrical insulating material to pressure whilst generating heat therein by the action of a high frequency field of electric force, a high frequency electrode by which pressure is applied to the material to be treated, a layer of high-loss heat-stable electrical insulating material of cellular form having a thickness of from about 0.01 inch to about 0.1 inch and a thin layer of adhesive securing the first said layer to the face of said electrode.

10. In apparatus for subjecting thermoplastic or thermo-setting electrical insulating material to pressure whilst generating heat therein by the action of a high frequency field of electric force, a high frequency electrode, a facing for said electrode of porous cordierite having a thickness of about 0.01 inch and adhesive securing said facing to said electrode.

JOSHUA CREER QUAYLE.
PETER JONES.

REFERENCES CITED

The following references are of record in the file of this patent:

UNITED STATES PATENTS

| Number | Name | Date |
| --- | --- | --- |
| 1,555,258 | Allcutt | Sept. 29, 1925 |
| 1,806,846 | Fox et al. | May 26, 1931 |
| 2,079,708 | Hart | May 11, 1937 |
| 2,341,617 | Hull | Feb. 15, 1944 |
| 2,370,624 | Gillespie | Mar. 6, 1945 |
| 2,404,191 | Quayle et al. | July 16, 1946 |

OTHER REFERENCES

Taylor, "Heating Wood with Radio-Frequency Power," Transactions of the U. S. M. E., April, 1943, pages 209 and 210.